(12) United States Patent
Gaulke

(10) Patent No.: US 8,851,540 B1
(45) Date of Patent: Oct. 7, 2014

(54) GRILL GRATE REMOVAL DEVICE

(71) Applicant: Brent S. Gaulke, Woodinville, WA (US)

(72) Inventor: Brent S. Gaulke, Woodinville, WA (US)

( * ) Notice: Subject to any disclaimer, the term of this patent is extended or adjusted under 35 U.S.C. 154(b) by 0 days.

(21) Appl. No.: 13/958,035

(22) Filed: Aug. 2, 2013

(51) Int. Cl.
  *F24B 15/00* (2006.01)
  *B65G 7/12* (2006.01)
  *A47J 37/07* (2006.01)

(52) U.S. Cl.
  CPC ............... *A47J 37/0786* (2013.01); *B65G 7/12* (2013.01)
  USPC .................................... 294/9; 294/12; 294/26

(58) Field of Classification Search
  CPC .......... F23J 1/04; A47J 45/10; A47J 37/0786; A47J 36/12; F24B 15/10; B65G 7/12; A45F 5/1026; A45F 2005/1033; A45F 2005/1073; A45F 5/102; A24B 15/00
  USPC ............ 294/9, 10, 12, 26, 137, 145, 158, 170
  See application file for complete search history.

(56) References Cited

U.S. PATENT DOCUMENTS

| | | | | |
|---|---|---|---|---|
| 572,815 A | * | 12/1896 | Nicholes | 294/2 |
| 1,103,780 A | * | 7/1914 | Lawrence | 294/10 |
| 4,036,424 A | * | 7/1977 | Thany | 16/406 |
| D246,886 S | | 1/1978 | Malafouris | |
| 4,482,181 A | | 11/1984 | Shepherd | |
| D312,375 S | | 11/1990 | Hessler | |
| D340,863 S | * | 11/1993 | Daigle | D9/434 |
| D341,297 S | | 11/1993 | Martner | |
| 5,425,562 A | * | 6/1995 | Baldwin | 294/26 |
| 5,797,166 A | * | 8/1998 | Wagenheim | 16/443 |
| 6,000,739 A | | 12/1999 | Zemit et al. | |
| 6,039,372 A | | 3/2000 | Noe et al. | |
| 6,247,739 B1 | * | 6/2001 | Lyon | 294/159 |
| 7,108,304 B2 | | 9/2006 | White | |
| 7,213,851 B2 | * | 5/2007 | Mann | 294/26 |
| 7,377,568 B2 | * | 5/2008 | Moses | 294/170 |
| 8,465,068 B1 | * | 6/2013 | Vinson, Jr. | 294/9 |
| 8,556,310 B1 | * | 10/2013 | Nabors | 294/9 |
| 8,562,044 B2 | * | 10/2013 | Mowry | 294/9 |
| 2005/0088002 A1 | | 4/2005 | Dwyer | |
| 2009/0206621 A1 | * | 8/2009 | Payne | 294/158 |
| 2010/0019114 A1 | * | 1/2010 | Vargo | 248/309.1 |

\* cited by examiner

*Primary Examiner* — Saul Rodriguez
*Assistant Examiner* — Gabriela Puig

(57) ABSTRACT

A grill grate removal device lifts and removes grates from a grill in order to clean the grill grates. The device includes a main body. A lifting member is coupled to the main body and is configured to lift grates from a grill. The lifting member has a first portion coupled to and positioned perpendicular relative to a second portion wherein the second portion is configured for positioning perpendicularly between adjacently positioned grates such that a top end of the second portion abuts a bottom edge of the grates wherein upward force on the grates permits removal of the grates from the grill.

8 Claims, 3 Drawing Sheets

GRILL GRATE REMOVAL DEVICE

BACKGROUND OF THE DISCLOSURE

Field of the Disclosure

The disclosure relates to removal devices and more particularly pertains to a new removal device for lifting and removing grates from a grill in order to clean the grill grates.

SUMMARY OF THE DISCLOSURE

An embodiment of the disclosure meets the needs presented above by generally comprising a main body. A lifting member is coupled to the main body and is configured to lift grates from a grill. The lifting member has a first portion coupled to and positioned perpendicular relative to a second portion wherein the second portion is configured for positioning perpendicularly between adjacently positioned grates such that a top end of the second portion abuts a bottom edge of the grates wherein upward force on the grates permits removal of the grates from the grill.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
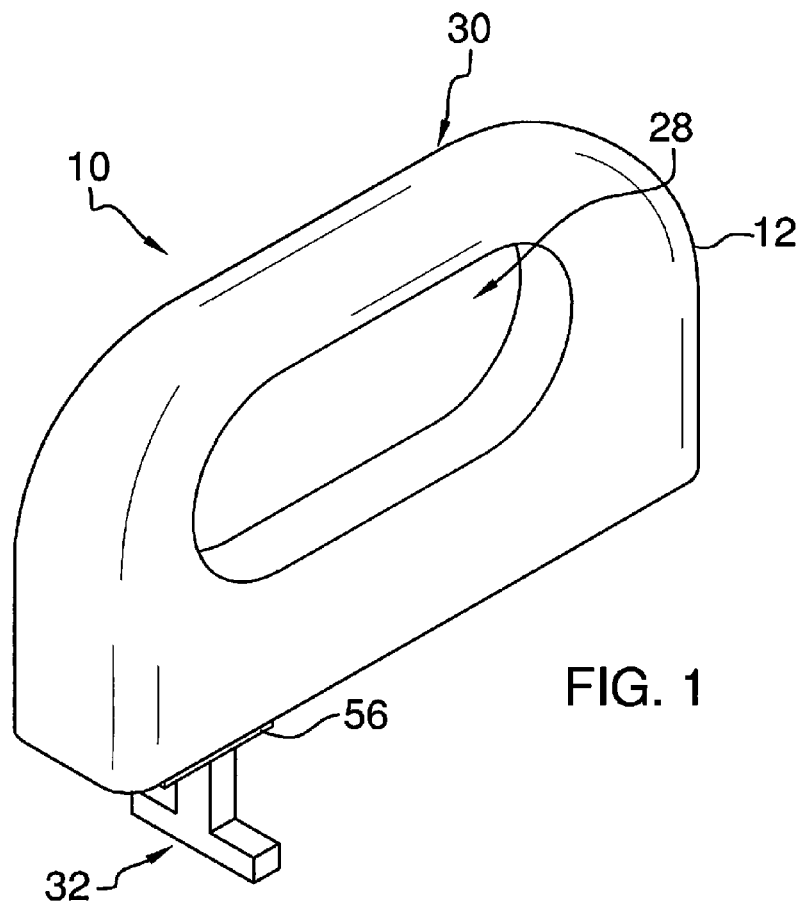
FIG. 1 is a top front side perspective view of a grill grate removal device according to an embodiment of the disclosure.
Figure 2:
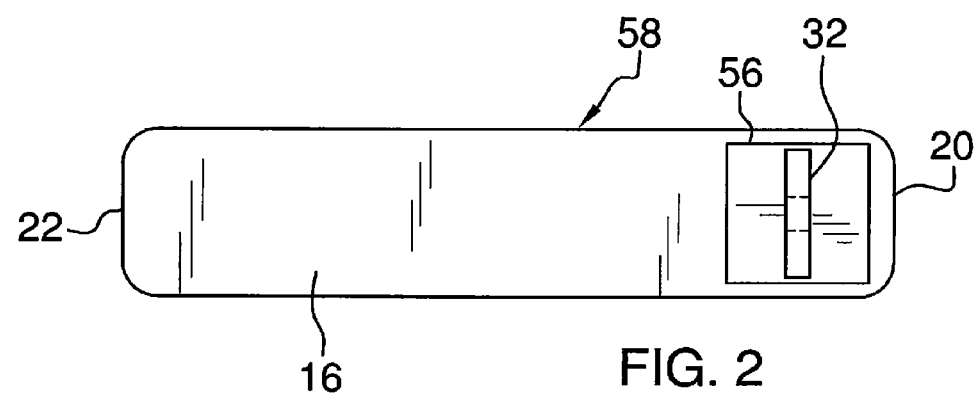
FIG. 2 is a bottom view of an embodiment of the disclosure.
Figure 3:
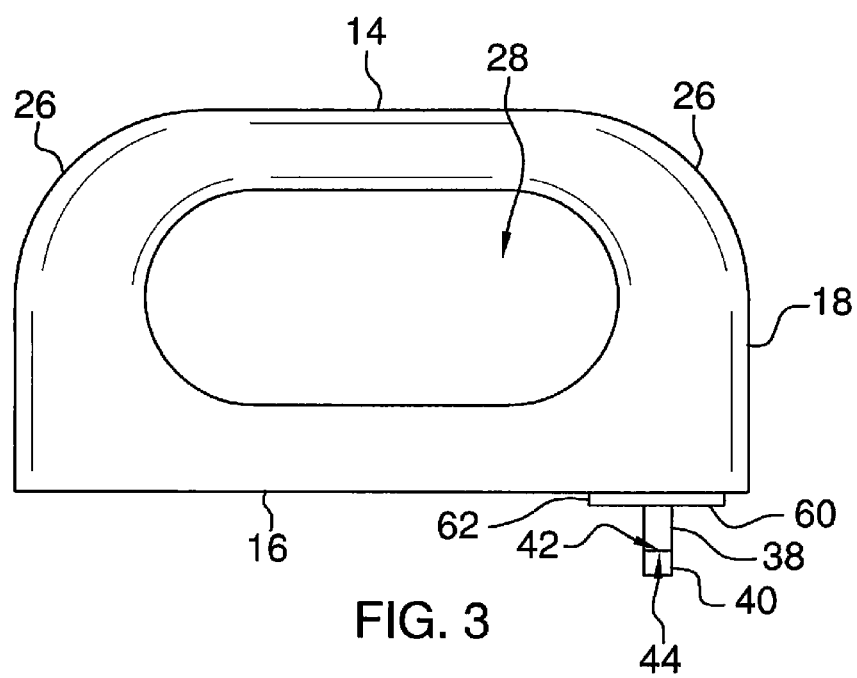
FIG. 3 is a side view of an embodiment of the disclosure.
Figure 4:
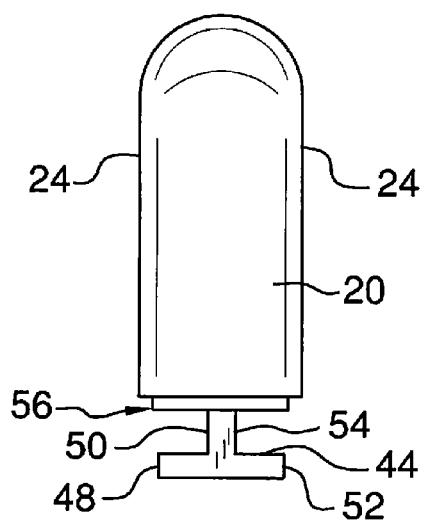
FIG. 4 is a front view of an embodiment of the disclosure.
Figure 5:
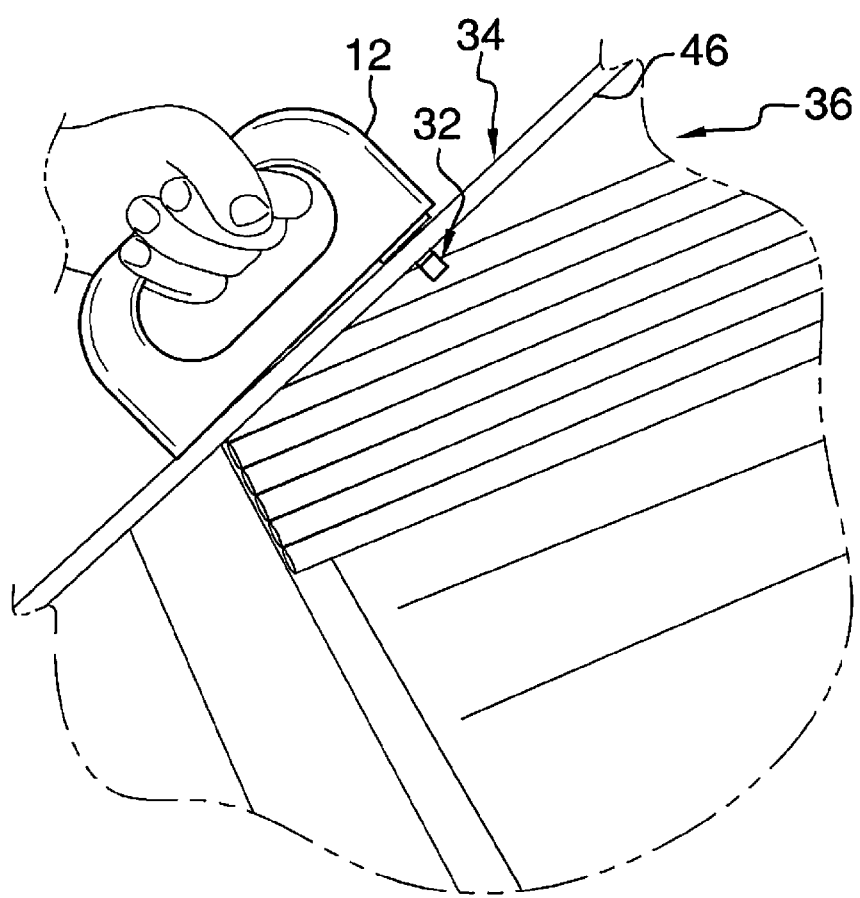
FIG. 5 is an in-use side view of an embodiment of the disclosure.

With reference now to the drawings, and in particular to FIGS. 1 through 5 thereof, a new removal device embodying the principles and concepts of an embodiment of the disclosure and generally designated by the reference numeral 10 will be described.

As best illustrated in FIGS. 1 through 5, the grill grate removal device 10 generally comprises a main body 12 having a top side 14, a bottom side 16, and a peripheral wall 18 extending between the top side 14 and the bottom side 16. The peripheral wall 18 includes a front side 20, a back side 22, and a pair of lateral sides 24. A convexly arcuate juncture 26 may be positioned between each of the front 20 and back 22 sides and the top side 14.

An opening 28 is preferably positioned in the main body 12 and extends between the lateral sides 24 of the main body 12. The opening 28 defines a grip 30 positioned above the opening 28 wherein the grip 30 is configured for manual grasping by a user. The opening 28 is preferably oval-shaped.

A lifting member 32 is coupled to the main body 12 wherein the lifting member 32 is configured to lift a grate 34 from a grill 36. The lifting member 32 preferably extends outwardly from the bottom side 16 of the main body 12. The lifting member 32 is T-shaped and has a first portion 38 coupled to and positioned perpendicular relative to a second portion 40 wherein the second portion 40 is configured for positioning perpendicularly between adjacently positioned grates 34 such that a top end 44 of the second portion 40 abuts a bottom edge 46 of the grates 34 wherein upward force on the grates 34 permits removal of the grates 34 from the grill 36. The first portion 38 preferably extends downwardly from the bottom side 16 of the main body 12. A bottom end 42 of the first portion 38 may be coextensive with the top end 44 of the second portion 40. A first end 48 of the second portion 40 extends laterally away from a first side 50 of the first portion 38. A second end 52 of the second portion 40 extends laterally away from a second side 54 of the first portion 38. The first end 48 and the second end 52 of the second portion 40 may extend toward the lateral sides 24 of the main body 12.

A coupler 56 couples the lifting member 32 to the main body 12. The coupler 56 is preferably offset from a perimeter edge 58 of the bottom side 16. The coupler 56 has a bottom surface 60 and a perimeter wall 62 extending between the bottom surface 60 and the bottom side 16. The coupler 56 is preferably offset from the first 48 and second 52 ends of the second portion 40 of the lifting member 32.

In use, as stated above and shown in the Figures, a user grasps onto the grip 30 and positions the second portion 40 of the lifting member 32 between adjacently positioned grates 34. The user rotates the grip 30 ninety degrees to position the top end 44 of the second portions 40 against a bottom edge 46 of the grates and then lifts the grates 34 upwardly from the grill 36. In this manner, the grates 34 are easily removed from the grill 36 and cleaned as needed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A grill grate removal device comprising:
   a main body having a top side, a bottom side, and a peripheral wall extending between said top side and said bottom side, said peripheral wall including a front side, a back side, and a pair of lateral sides, said bottom side being elongated from said front side to said back side, a central area of said bottom side being defined between said front and back sides; and
   a lifting member coupled to said main body wherein said lifting member is configured to lift grates from a grill, said lifting member having a first portion coupled to and positioned perpendicular relative to a second portion wherein said second portion is configured for positioning perpendicularly between adjacently positioned grates such that a top end of said second portion abuts a bottom edge of the grates and upward force on the grates permits removal of the grates from the grill, said first portion of said lifting member extending downwardly from said bottom side, said lifting member being positioned between said central area and said front side to facilitate abutting a juncture of said bottom side and said back side against the grill when said lifting member engages the grill.

2. The device of claim 1, further comprising an opening positioned in said main body, said opening defining a grip positioned above said opening wherein said grip is configured for manual grasping by a user, said opening extending between a pair of lateral sides of said main body.

3. The device of claim 2, further comprising said opening being oval-shaped.

4. The device of claim 1, further comprising said lifting member being T-shaped wherein a first end of said second portion extends laterally away from a first side of said first portion and a second end of said second portion extends laterally away from a second side of said first portion.

5. The device of claim 1, further comprising a bottom end of said first portion being coextensive with said top end of said second portion.

6. The device of claim 1, further comprising a coupler coupling said lifting member to said main body.

7. The device of claim 6, further comprising said coupler being offset from a perimeter edge of a bottom side of said main body.

8. A grill grate removal device comprising:

a main body having a top side, a bottom side, and a peripheral wall extending between said top side and said bottom side, said peripheral wall including a front side, a back side, and a pair of lateral sides, said bottom side being elongated from said front side to said back side;

a convexly arcuate juncture positioned between each of said front and back sides and said top side;

an opening positioned in said main body, said opening extending between said lateral sides of said main body, said opening defining a grip positioned above said opening wherein said grip is configured for manual grasping by a user, said opening being oval-shaped;

a lifting member coupled to said main body wherein said lifting member is configured to lift grates from a grill, said lifting member extending outwardly from said bottom side of said main body, said lifting member being T-shaped and having a first portion coupled to and positioned perpendicular relative to a second portion wherein said second portion is configured for positioning perpendicularly between adjacently positioned grates such a top end of said second portion abuts a bottom edge of the grates wherein upward force on the grates permits removal of the grates from the grill, said first portion extending downwardly from said bottom side of said main body, a bottom end of said first portion being coextensive with said top end of said second portion, a first end of said second portion extending laterally away from a first side of said first portion, a second end of said second portion extending laterally away from a second side of said first portion, said first end of said second portion and said second end of said second portion extending toward said lateral sides of said main body; and a coupler coupling said lifting member to said main body, said coupler being offset from a perimeter edge of said bottom side, said coupler having a bottom surface and a perimeter wall extending between said bottom surface and said bottom side, said coupler being offset from said first and second ends of said second portion of said lifting member, a central area of said bottom side being defined between said front and back sides, said coupler being positioned between said central area and said front side to facilitate abutting a juncture of said bottom side and said back side against the grill when said lifting member engages the grill.

* * * * *